(12) United States Patent
Guo (10) Patent No.: US 6,449,084 B1
(45) Date of Patent: Sep. 10, 2002

(54) OPTICAL DEFLECTOR

(76) Inventor: Yanping Guo, 2609 Hawkshead Ct., S. S., MD (US) 20904

( * ) Notice: Subject to any disclaimer, the term of this patent is extended or adjusted under 35 U.S.C. 154(b) by 0 days.

(21) Appl. No.: 09/567,151

(22) Filed: May 9, 2000

Related U.S. Application Data (60) Provisional application No. 60/133,495, filed on May 10, 1999.

(51) Int. Cl.[7] .......................... G02F 1/29; G02F 1/295; G02F 1/00; G02B 6/26
(52) U.S. Cl. .............................. 359/315; 385/8; 385/16; 359/321; 359/322
(58) Field of Search ................................. 359/245, 246, 359/247, 248, 279, 322, 323, 321, 320, 254, 315; 385/2, 28, 14, 8, 16

(56) References Cited

U.S. PATENT DOCUMENTS

| | | |
|---|---|---|
| 4,462,658 A | 7/1984 | Scifres et al. |
| 4,820,009 A | 4/1989 | Thaniyavarn |
| 5,061,048 A | 10/1991 | Hayden et al. |
| 5,155,620 A | 10/1992 | Gordon et al. |
| 5,291,567 A | 3/1994 | Revelli et al. |
| 5,355,181 A | 10/1994 | Ashizati et al. |
| 5,467,104 A | 11/1995 | Furness et al. |
| 5,802,223 A | 9/1998 | Nashimoto |
| 5,920,662 A * | 7/1999 | Hinkov ........................ 385/14 |
| 5,933,554 A * | 8/1999 | Leuthold et al. .............. 385/28 |

* cited by examiner

Primary Examiner—Georgia Epps
Assistant Examiner—David N. Spector (57) ABSTRACT

An electrooptical deflector that overcomes conventional geometry limitations and can deflect an optical beam at high speed with high deflection angle and high resolution. It comprises an array of waveguide optical channels having an electrooptical layer sandwiched between a bottom and a top electrodes. Either the top electrode further comprises two sets of prism-shaped electrodes; or, the electrooptical layer further comprises two sets of prism-shaped spontaneous polarization domain regions. Linear phase differences are induced among a group of sub-light beams travelling in the individual optical channels. After leaving the individual optical channels, the sub-light beams are merged and the merged light beam is deflected along a direction depending on a voltage or a pair of voltages applied between the top and bottom electrodes. The optical defector requires one or a pair of low driving voltage(s) with a simple driving scheme. It is suitable for many important applications, such as optical switching, high quality retinal display in potable computer, video and virtual reality devices, optical processing, pattern recognition, laser printing and bar code scanning.

16 Claims, 5 Drawing Sheets

OPTICAL DEFLECTOR

This application claims priority from Provisional application Ser. No. 60/133,495 filed May 10, 1999.

BACKGROUND OF THE INVENTION

1. Related Field

The present invention relates to an optical device and, more particularly, to an optical deflector that can rapidly change the direction of a light beam based on the electrooptical effect.

2. Description of the Related Art

Two of the major aspects that can characterize our information age are Internet and virtual reality. In order to meet the demand of exponential growth in data bandwidth, Internet development has been moving rapidly toward the direction of all-optical networking. The bottleneck to the realization of true all-optic networking is mainly the lack of an optical deflector or switch that can quickly route optical signals to different optical fibers or channels. Meanwhile, the advancement in virtual reality depends on the capability of high fidelity image display. One potential approach to achieving high fidelity image display is to form the image directly on the retina, which, too, depends on the breakthrough of optical deflector technology, so that an image-modulated light beam can scan the retina at high speed with high resolution.

In the conventional art, two main types of optical deflectors are in use, i.e., electromechanical one and electrooptical one. The electromechanical type of optical deflectors deflects a light beam through a moving mirror. Although high deflecting angle and high resolution can be easily obtained with this type of optical deflectors, the low deflecting speed inherent to its mechanic movement prohibits its use in high speed optical routing or scanning. Even with the latest on-substrate-machined micro-electromechanical mirror (MEMM), the best switching time of this type is still as high as on the order of milliseconds. On the other hand, the electrooptical type of optical deflectors made with certain electrooptical materials is capable to deflect a light beam as fast as in the order of nanoseconds to picoseconds, as the deflection of light in this type of optical deflectors is caused by the change in refractive index, and no mechanical moving part is involved. Among various electrooptical deflector structures in the conventional art, waveguide-type optical deflectors have the advantage to be readily fabricated and integrated with other optical elements in a common substrate. However, due to the limited electrooptical effect, the typical $\Delta n$, the change in refractive index, is only in the order of $10^{-3}$. As a result, the achievable deflecting angle is very small with the conventional electrooptical light deflectors.

The conventional waveguide-type optical deflector typically comprises a light guiding layer made of an electrooptical material sandwiched between a top cladding layer and a bottom cladding layer. When electrical fields with different polarities are generated between a bottom electrode and triangle-shaped top electrodes, a gradient of $\Delta n$ is induced in the light guiding layer along a direction transverse to the light traveling direction in the optical waveguide. It causes the effective length of optical paths to be changed from edge to edge, resulting in a tilt of the optical wavefront, and, therefore a deflection of the light beam. The peak-to-peak deflection angle is given approximately by:

$$\Delta\theta = 4\Delta n \frac{L}{D} \cdot \frac{1}{n_0} \quad (1)$$

wherein, $\Delta n$ is the induced change of refractive index in the light guiding layer under a driving voltage, L and D are respectively the length and width of optical waveguide, and, $n_o$ is the refractive index in the observing medium. Although the deflection angle is proportional to the ratio of L/D as shown in Eq. (1), this ratio can only be increased to a point at which the front of a presumedly focused light beam has been bent so much inside the waveguide that it starts to hit one of the two edges of the waveguide. Accordingly, the geometrically allowable maximum ratio of L/D is approximately as:

$$\left(\frac{L}{D}\right)_{max} = \left(\frac{n}{4\Delta n}\right)^{\frac{1}{2}} \quad (2)$$

Consequently, the achievable maximum peak-to-peak deflection angle with the conventional waveguide optical deflectors is:

$$(\Delta\theta)_{max} = \frac{2(\Delta n \cdot n)^{\frac{1}{2}}}{n_0} \quad (3)$$

If the light guiding layer is made of $LiNbO_3$, which is one of the most commonly used electrooptical materials and has a typically achievable $\Delta n$ of upper to 0.001, then, according to Eq. (3), its achievable maximum peak-to-peak deflection angle with the conventional waveguide optical deflector structure is only 5.33 degrees if observed in the air or only 2.45 degrees if observed inside a planar waveguide extended from the waveguide deflector. Besides, for actually achieving a large deflection angle, the width of the waveguide needs to be as small as possible, which requires the edges of the waveguide has to be very smooth; otherwise, the scattering from the edges of the waveguide tends to cause the phase distribution in the wavefront to be randomized, which deteriorates the achievable resolution for the light beam. The limitations in the achievable deflection angle and resolution make it difficult for the conventional waveguide optical deflectors to be used as the optical switch in optical routing devices.

It is noted that there are also other types of optical switches based on the electrooptical effect, such as the one having a Mach-Zehnder interferometer structure and the one that enables optical path shifting based on optical polarization changes. While they generally can switch a light beam at high speed, they usually have their own drawbacks, such as high insertion loss and high crosstalk.

On the other hand, in virtual reality retinal display in a display format similar to the one in HDTV display or Super VGA display, the required horizontal scanning resolution is as high as about 1100 and 1280, respectively. If the conventional $LiNbO_3$ waveguide optical deflector is to be used as a scanner for the super VGA display, the width of the light beam in the waveguide has to be about 7.15 mm or wider for meeting the horizontal resolution requirement. And, with light beam width being wider than 7.15 mm, its achievable deflection angle will be smaller than the achievable maximum deflection angle of 5.33 degrees, due to the geometry limitations discussed above. The deflection angle needs to be greatly magnified so that a horizontal view angle can be as wide as at least 45 degrees for high quality display;

meanwhile, the width of the light beam needs to be reduced to about 2 mm or smaller when passing the pupil of the eye. And it necessitates a sophisticated optical system to accommodate these needs simultaneously, which makes it extremely difficult, if not impossible, for the conventional waveguide optical deflector to be formed on a head-mounted display device that is comparable to an ordinary pair of eye glasses in size and weight.

Accordingly, there is a strong need for an optical deflector that can overcome the aforementioned conventional geometry limitations. And, an optical deflector that can work at high speed with high deflection angle and high resolution is not only critical to future optical devices, such as all-optical switching and high fidelity retinal image display, but also crucial to the improvement of a variety of today's optical devices including: laser printer, bar code scanner, potable computer display, etc.

SUMMARY OF THE INVENTION

An object of the present invention is to provide an electrooptical deflector that can deflect a light beam at high speed with large deflection angle and high resolution. Another objective of the present invention is to provide a method for making the electrooptical deflector. Important aspects of the present invention include: the optical deflector has a basic structure that is readily scalable to be used, for example, as an optical switch in all-optical switching or as an optical scanner in high fidelity retinal display; It is small in size and light in weight, and, is easy to be formed in planar structure and to be integrated with other optical circuits on a common substrate; furthermore, it has a simple electrode structure and requires a low driving voltage with a simple driving scheme.

The basic structure of the optical deflector according to the present invention comprises an array of waveguide optical channels having an electrooptical layer sandwiched between a bottom electrode and one or more prism-shaped top electrode(s). When a substantially coherent light beam is split among and traveling in theses optical channels, linear phase differences are induced among the sub-light beams travelling in these individual optical channels with a voltage or a pair of voltages being applied between the top and the bottom electrodes. After these sub-light beams are emerged from the optical channels, the wavefront of the merged light beam at the far field is tilted due to the linear phase differences induced among the sub-light beams, resulting in a deflection of the light beam along a direction depending on the voltage or the pair of voltages applied to it.

The optical deflector according to the present invention overcomes the geometry limitations inherent in the conventional electrooptical deflectors by confining the light beam in the individual optical channels in the electrooptically active region. The deflection angle can be increased by increasing the ratio of the length over the total width of the optical channels, without having to worry about any over-tilting of the wavefront inside the electrooptically active region, as long as the deflection angle is within the range of −90 degrees to +90 degrees. Consequently, large deflection angle, high resolution and high speed can be simultaneously accomplished with the optical deflector according to the present invention.

In addition, because the electrooptically active layer is sandwiched between the top and bottom electrodes, the optical deflector according to the present invention has high deflection efficiency and requires a low driving voltage.

BRIEF DESCRIPTION OF THE DRAWINGS

FIGS. 2A–2D show the main process steps for making an inorganic optical deflector according to the present invention.

DETAILED DESCRIPTION OF THE INVENTION

1. Basic Structure of the Optical Deflector

Figure 1A:
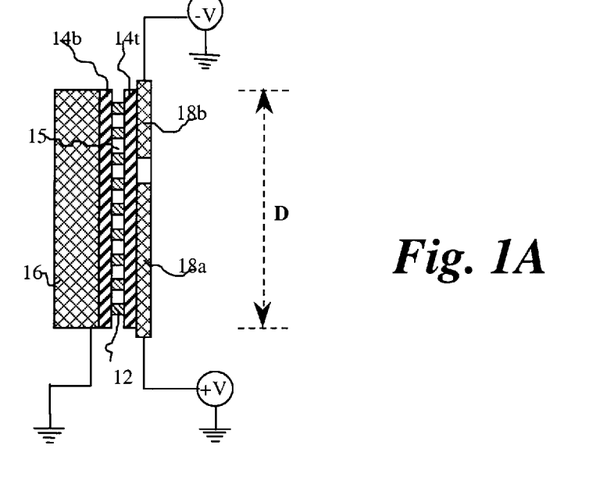
FIGS. 1A–1E schematically illustrate the basic structures of an electrooptical deflector according to the present invention.
Figure 1B:
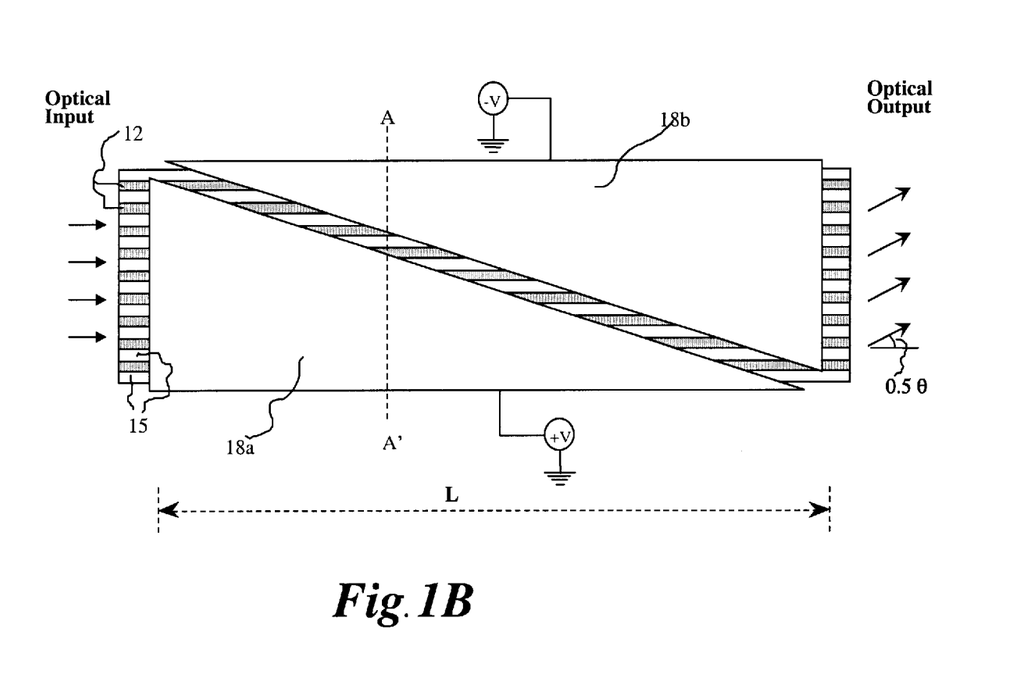

FIGS. 1A and 1B schematically illustrate the basic structure of the optical deflector according to the present invention. It comprises an array of parallel optical waveguide channels which have an electrooptical material as the channel's light guiding core 12, sandwiched between a bottom and a top waveguide buffer layers 14b and 14t, and separated by an optical cladding layer 15. The buffer layers 14b and 14t and the cladding layer 15 can be made of either a same material or different materials having lower refractive index than that of the light guiding core. The cladding layer 15 may also be of a gas or vacuum. The electrooptical materials for the channel's light guiding core can be any of the electrooptical materials used in the conventional electrooptical devices, including inorganic or organic ones in either solid state or liquid state. Preferred electric-optical materials include ferroelectric materials such as nonlinear optical polymers (NLOP), $LiNbO_3$, PLZT, $BaTiO_3$, $PbTiO_3$, $LiTaO_3$, ADP, KDP, $KNbO_3$, SBN, AMO and KTN, and semiconductor materials, such as a-Si and semiconductor superlattices. When a ferroelectric material is used for the channel's light guiding core, its spontaneous polarization is poled along a same direction of either from the bottom to the top or vice versa. These waveguide channels are further sandwiched by a bottom electrode 16 that is maintained to be relatively neutral and a pair of triangle-shaped top electrodes 18a and 18b that are connected to a pair of voltage suppliers of opposite polarities.

Each of the waveguide channels thus includes two portions: one is covered by the top electrode 18a, and the other is covered by the top electrode 18b. The ratio between the lengths of the two portions in each channel changes linearly from channel to channel along the channel array's width direction, because of the relative positions of the triangle-shaped top electrodes 18a and 18b. With non-zero voltages, +V and −V, being applied to the top electrodes 18a and 18b, respectively, the effective refractive index of each portion's channel core will be either increased or decreased, depending on which top electrodes, 18a or 18b, covers that portion. As a result, linear differences in effective average refractive index is induced among the optical channels. When a substantially coherent light beam is split among and travelling in these optical channels, linear phase differences are then induced among the sub-light beams travelling in these individual optical channels. After these sub-light beams are emerged from the optical channels, the wavefront of the merged light beam at the far field is tilted due to the linear phase differences induced among the sub-light beams, resulting in a deflection of the light beam along a direction perpendicular to the tilted wavefront.

The deflection angle θ of the light beam may still be approximately expressed similarly by Eq.1, with the L being now the length of the waveguide optical channels which are covered by the top electrodes; D being the total width of the array of the waveguide channels; and, $\Delta n$ being the induced change of refractive index in the channel's electrooptical core. However, unlike the conventional electrooptical deflector, the optical deflector of the present invention no longer suffers the geometry limitations given in Eq. 2, since in the present invention the light beam is split into sub-light beams which are confined to travel in the individual optical channels before becoming a single light beam again.

Figures 1C, 1D:
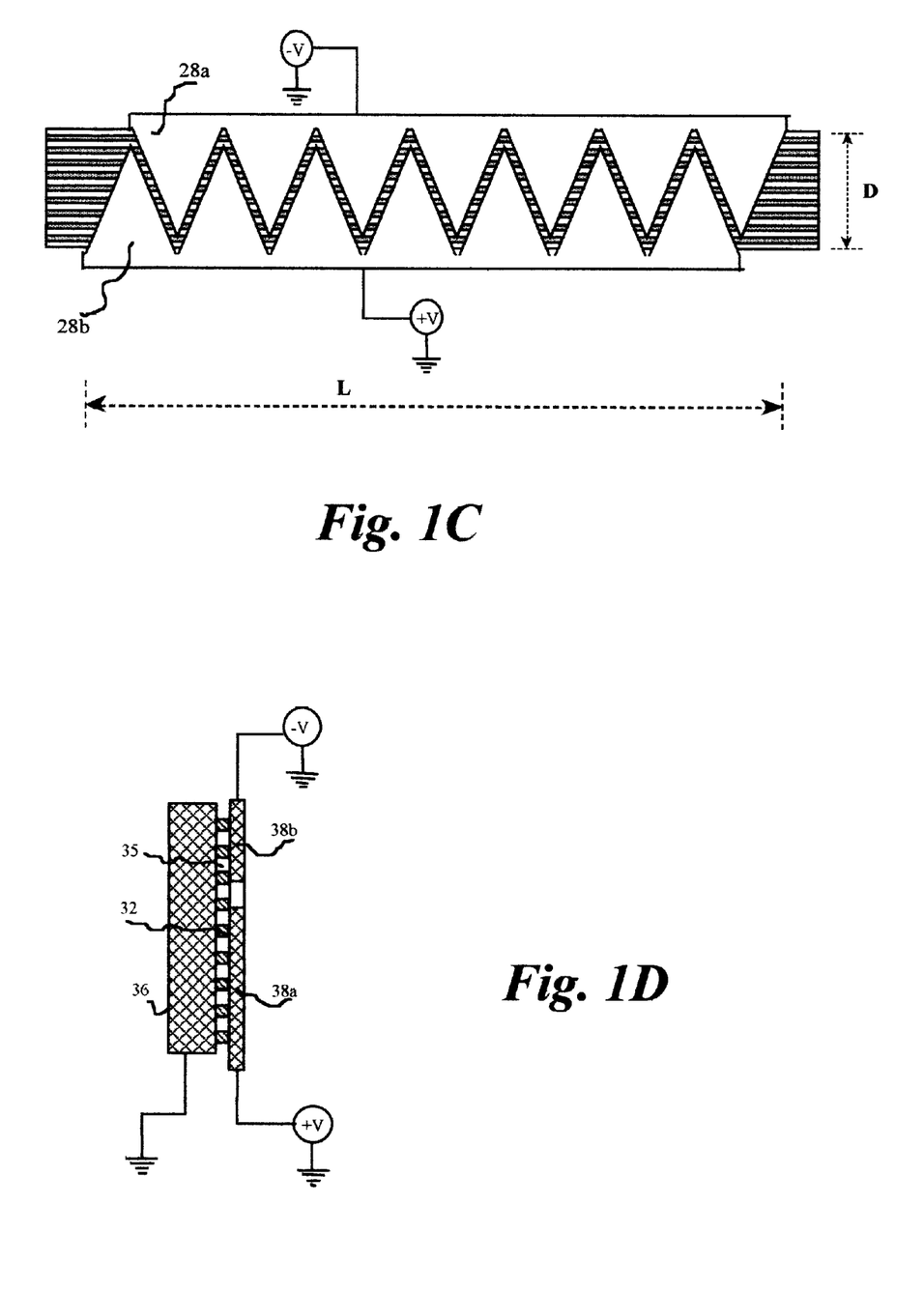

The tilted edges of the top electrodes 18a and 18b can also be shaped with steps, so that longer channel length can be maintained; while within each channel the electric field profile still remains well defined for high deflecting resolution. Furthermore, in practice, the top electrode may comprise more than one pair of triangle electrodes, as shown in FIG. 1C, in which these triangles are divided into two sets of electrodes 28a and 28b by assembling the triangles that have their bases on a same side into a same set. If the spontaneous polarization of the electrooptical material in the optical channel's core is poled all along a same direction either from the bottom to the top or vice versa, the optical deflector can be driven by a pair of voltages with opposite polarities supplied respectively to the two sets of top electrodes 28a and 28b. If the gap size between neighboring triangle electrodes are neglectful, then different top electrodes having different numbers of pairs of triangles are substantially equivalent, i.e., their resulting deflection angles are substantially the same, provided the driving voltages are the same.

Figure 1E:
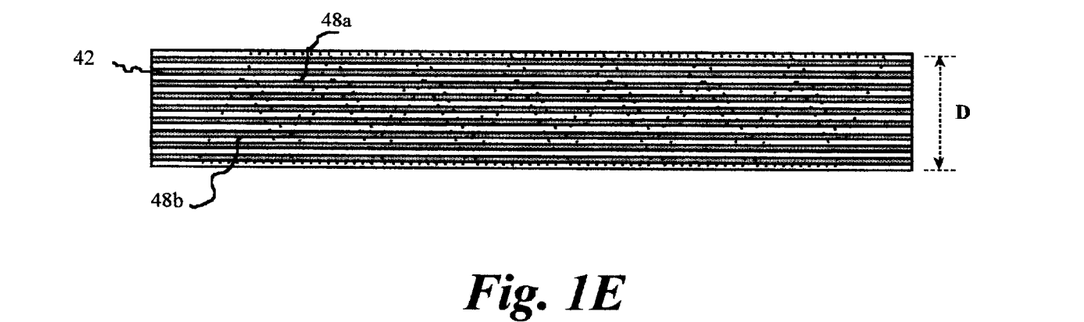

Unlike other types of phase array defectors in which the phase differences are not all linear and are kept within (0, $2\pi$), which therefore require very complicated driving systems to supply different varying voltages to each of the individual optical paths in the phase array, the optical deflector of the present invention enables a very simple driving scheme which require no more than a pair of driving voltages of opposite polarities for the two sets of the top electrodes. In addition, the driving voltage suppliers can even be reduced to a single-voltage suppler by forming two sets of triangle-shaped spontaneous polarization domain regions 48a and 48b in the core layer 42, as shown in FIG. 1E. Within each of the two sets 48a and 48b, the spontaneous polarization is poled in a same direction and is in anti-parallel to the spontaneous polarization in the other set. It by way of example can be accomplished by applying a pair of poling voltages of opposite polarities to two sets of top triangle electrodes, such as the ones shown in FIG. 1C, during the poling of the core layer 42. Then, the two sets of top electrodes are connected together to become a single top electrode or a new single-piece top electrode is formed. The resulting optical deflector can now be driven by applying a voltage between the top electrode and bottom electrode with a single-voltage supplier.

The core layer may also comprise other layer or layers of non-electrooptical material(s). Furthermore, the electrooptical layer may also be formed in the buffer or clay layer(s), instead of in the core layer. It is of interest especially in the case that the electrooptical material has very high electrooptical coefficient and low refractive index, but high optical absorption coefficient, such as ferroelectric liquid crystal materials.

Furthermore, it is noted that one or both of the top and bottom buffer layers can be omitted if the corresponding one or both of the top and bottom electrodes are made with one of conductive or semiconductive optical materials, such as ITO, Nd-doped $SrTiO_3$, Al-doped ZnO, and other doped semiconductors. And, the bottom electrode and the substrate may become a single layer if the substrate is made of a conductive or semiconductive optical material, as shown in FIG. 1D, in which the channel guiding layer 32 is sandwiched directly by the top electrodes 38a and 38b and the bottom electrode 36 which also serves as the substrate. Apparently, without the top and bottom buffer layers, the optical deflector becomes more efficient as a same change in refractive index can now be induced with a lower voltage.

By way of example, the array of waveguide channels is formed with a $LiNbO_3$ layer of 0.5 $\mu m$ thick as the light guiding core in a structure similar to what is shown in FIG. 1D. It has a length L of 8 cm, width D of the channel array about 0.25 mm. It includes 62 individual optical channels, each of which is 2.5 $\mu m$ wide, with a 1.5 $\mu m$ separation between two neighboring channels. And, its top electrodes have two sets of triangle-shaped electrodes, which each has a height equaling to the width D of the channel array, similar to what is shown in FIG. 1C. A peak $\Delta n$ of about 0.001 can be induced in the guiding core under a peak driving voltage of about 3.3 v between the top and bottom electrodes, which results in a peak-to-peak deflection angle larger than 50 degrees, compared to the achievable maximum peak-to-peak deflection angle of only 5.33 degrees in the conventional waveguide optical deflectors. In the visible light range, it has a resolution of about 640, which is good enough for bar code scanning and for horizontal scanning in regular video display.

(2). Method of Making the Optical Deflector

Based on the well known method of making the conventional waveguide-type electrooptical deflector, the process for making the optical deflector of the present invention further involves steps of patterning the optical channels and forming cladding layer between the channels, which can be implemented with conventional lithography and thin film depositing techniques. Two examples are provided below to illustrate how to form an array of optical channels between top and bottom electrodes, with the electrooptical guiding core layer being formed of either a non-organic material or a polymeric material.

Figure 2A:
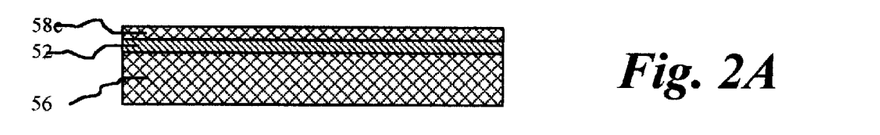
Figure 2B:
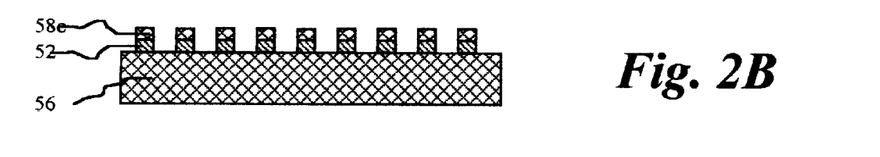
Figure 2C:
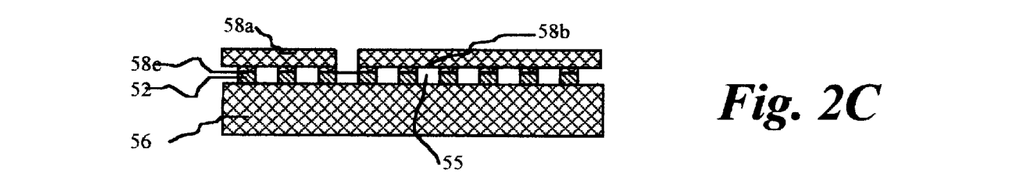

FIGS. 2A–2C illustrate the main sequential processes for forming an optical deflector comprising a non-organic electrooptical guiding core layer 52 in the optical channel array. The electrooptical layer 52 for forming guiding core is by way of example a PLZT formed on a bottom electrode/substrate 56 made of or coated with Nd-doped $SrTiO_3$. The electrooptical layer 52 can also be of $LiNbO_3$ formed on a bottom electrode/substrate made of or coated with Al-doped ZnO. Start with FIG. 2A, the electrooptical layer 52 and a conducting or semiconducting optical capping layer 58c are deposited on the bottom electrode/substrate 56 through any of the conventional thin film vapor phase or wet depositing processes, such as magnetron sputtering, ion beam sputtering, electron beam evaporation, laser ablation, various chemical vapor depositions, liquid phase epitaxy and sol-gel growth as well. Then the electrooptical layer 52 and the capping layer 58c are patterned into individual channels, as shown in FIG. 1B, through ion milling or RIE with a pre-patterned photoresist layer or a hard mask as the mask for during the milling or etching process. Due to the protection from the capping layer 58c, the channel patterning process is very flexible; and, over-milling or over-etching is allowable, as shown in FIG. 2B'. The gap between two neighboring channels is filled with a cladding layer of a low index silicon glass through spin-coating; and any over-coated portion of the glass layer is then removed through ion milling, etching or CMP, so that the patterned capping layer 58c resurfaces before an additional top conductive or semiconductive layer is deposited on it, as shown in FIG. 2C. The capping layer 58c and the additional top layer form a pair of top electrodes 58a and 58b after they are patterned together or individually into the desired triangle shapes.

Figure 3A:
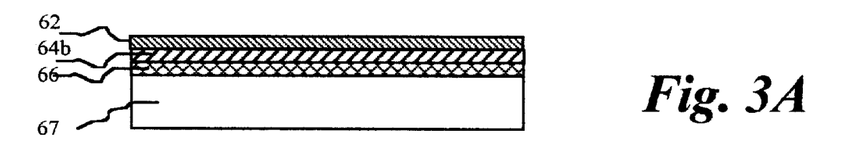
FIGS. 3A–3C show the main process steps for making an organic optical deflector according to the present invention.
Figure 3B:
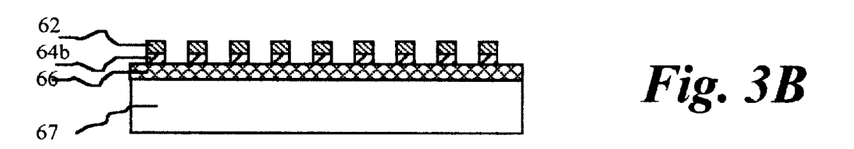
Figure 3C:
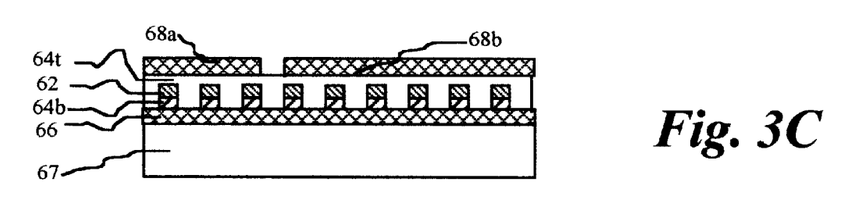

FIGS. 3A–3C illustrate the key steps of forming an organic electrooptical deflector according to the present invention. The organic electrooptical layer used for forming the guiding core can be one of a nonlinear optical polymers (NLOP) containing nonlinear optical moieties as covalently linked part of polymer chains. As shown in FIG. 3A, a bottom cladding layer 64b made of a low index polymer or $SiO_2$ is first spin-coated or deposited atop a metal electrode layer 66, which itself is pre-deposited on a substrate 67 made of a glass, high temperature polymer, semiconductor or other materials. An NLOP layer 62 is then spin-coated or dip-coated on the lower cladding layer 64b, followed by the patterning of the NLOP layer 62 into individual channels through ion milling or etching with a pre-patterned photo-resist layer or a hard mask layer as the mask during the milling or etching process, as shown in FIG. 3B, wherein, over-milling or over-etching into the bottom cladding layer 64b is also allowable. An upper cladding layer 64t is formed by spin-coating a low index polymer or glass layer on the patterned NLOP layer 62, which also fills the gap between two neighboring channels. Finally, a top metal electrode layer is deposited on the upper cladding layer and patterned into desired triangle shapes 68a and 68b.

(3). Application of the Optical Deflector

Due to its high speed with high deflection angle and high resolution, the optical deflector of the present invention is suitable for many important applications, such as optical switching, potable computer or video display, optical processing, pattern recognition, laser printing, bar code scanning, etc. Two examples are provided below regarding its applications in optical switching and in potable high quality display.

Figure 4A:
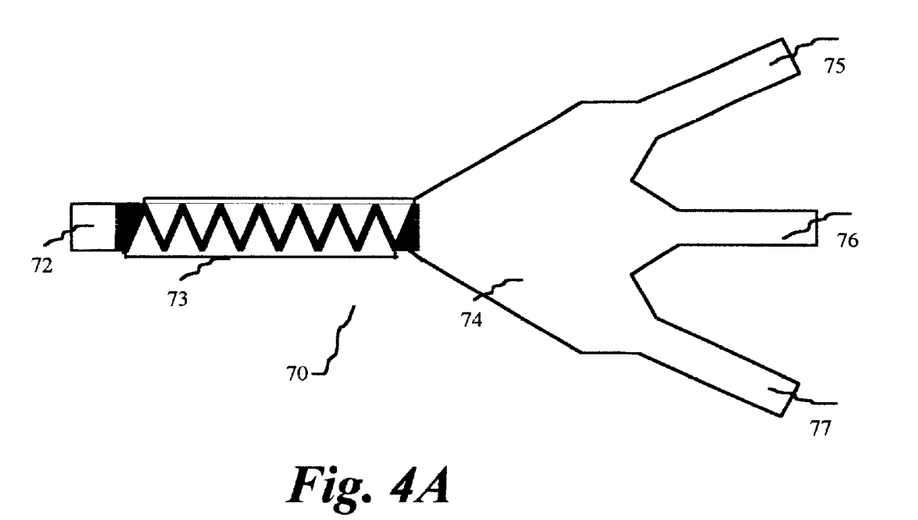
FIGS. 4A and 4B schematically illustrate a 3×3 switch using the optical deflector of the present invention as the basic switching elements.
Figure 4B:
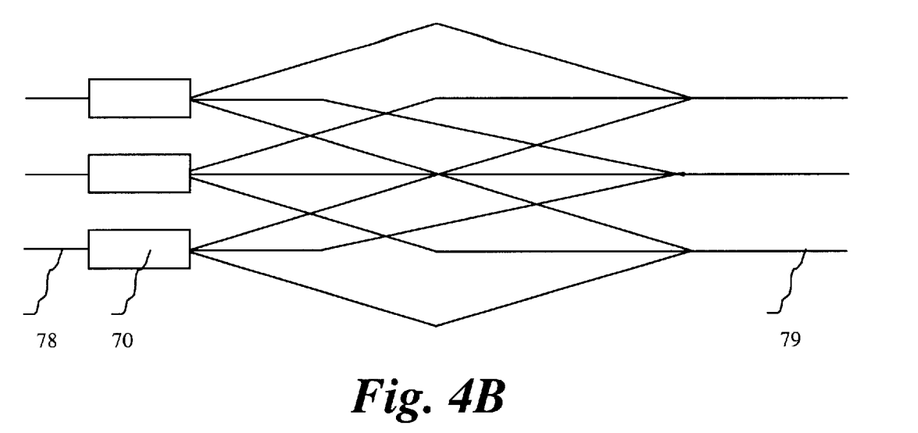

FIG. 4B shows a 3×3 optical switch suitable for all-optical switching or routing, which can direct an optical signal from any of the three input ports 78 to any of the three output ports 79. It comprises three individual electrooptical deflectors 70 of the present invention, which are formed on a same substrate. As shown in FIG. 3A, each of the deflectors 70 can steer an incoming light beam through a planar waveguide 74 to one of the three output ports 75, 76 and 77, corresponding to a voltage of +V, 0 and −V applied between its top and bottom electrodes 73, respectively. An M×N optical switch with each of M and N being an integer substantially larger than 3 can also be formed by assembling an adequate number of individual 3×3 optical switches into an M×N switch matrix.

By way of example, each of the individual optical deflectors 70 has an electrooptical channel core layer made of 0.5 $\mu$m-thick $LiNbO_3$ in a structure similar to what is shown in FIG. 1D. It has a length L of 1 cm, width D of 0.1 mm including 25 individual optical channels, each of which is 2.5 $\mu$m wide with a 1.5 $\mu$m separation; and, its top electrodes have two sets of triangle electrodes which each has a height equaling to the width D of the channel array, similar to what is shown in FIG. 1C. Then, with a peak $\Delta n$ of about + or −0.001, corresponding a peak driving voltage of about + or −3.3 v, the peak-to-peak deflection angle is about 10.2 degrees inside the planar waveguide 74, compared to the achievable maximum peak-to-peak deflection angle in the planar waveguide of about 2.45 degrees in the conventional waveguide optical deflectors. By extending the length L of the optical channels, a 1×K optical switch with K being an integer larger than 100 can also be achievable with an individual optical deflector according to the present invention. And, by forming the channel light guiding layer with other materials that possess higher electrooptical coefficient, such as PLZT or certain NLOPs, the length of the optical channel array can be substantially reduced.

Figure 5:
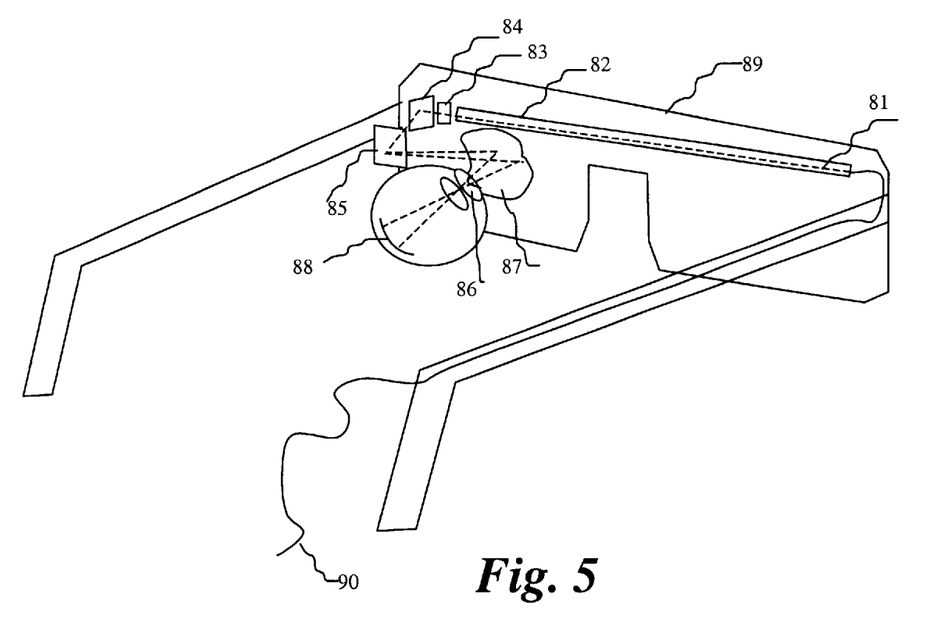
FIG. 5 is a diagrammatic view of a retinal display system using the optical deflector of the present invention as the horizontal optical scanner.

FIG. 5 illustrates the application of the optical deflector of the present invention as an optical scanner 82 in a retinal display device. The optical scanner 82 horizontally and rapidly deflects an image-modulated optical beam 81 onto a vertical scanner 84. After being reflected from the vertical scanner 84, the optical beam 81, now scanning in two dimensions, is projected onto the pupil 86 of the eye through a mirror 85 and a concave mirror 87. The optical beam 81 finally impinges on the retina after being focused by the natural lens system inside the eyeball, forming an image directly on the retina. A cylindrical lens 83 is used to collimate the optical beam into a substantially square or circular shape.

By way of example, the array of waveguide channels in the optical scanner or deflector 82 is formed with a $LiNbO_3$ layer of 0.5 $\mu$m thick as the guiding core in a structure similar to what is shown in FIG. 1D. The length L of the channels is 16 cm, width D of the channel array about 0.5 mm. It includes 152 individual optical channels, each of which is 2.5 $\mu$m wide, with a 1.5 $\mu$m separation between two neighboring channels. And, its top electrodes have two sets of triangle electrodes, which each has a height equaling to the width D of the channel array, similar to what is shown in FIG. 1C. Then, with a peak $\Delta n$ of about + or −0.001, corresponding a peak driving voltage of about + or −3.3 v, the peak-to-peak deflection angle is larger than 50 degrees and the resulting scanning resolution is as high as 1280 in the visible light range, good enough for the horizontal scanning in high quality displays in either HDTV or Super VGA format.

Since the vertical scanning frequency is normally less than 100 Hz, the vertical scanner 84 can be an MEMM formed on a common substrate with the horizontal electrooptical scanner 82. It can also be a small galvanometric scanner or piezoelectric scanner. The whole scanning and projection system is mounted on an eye-glass-like frame 89, which is comparable in size and weight with that of a regular pair of eye glasses. The image-modulated optical beam 81 and the scanning voltages supplied to the scanners 82 and 84 are fed to the frame 89 through a flexible cord 90 that comprises an optical fiber and three or four fine electrical wires.

And, as noted before, by forming the channel light guiding layer with other. materials that possess higher electrooptical coefficient, such as PLZT or certain NLOPs, the length of the optical channel array can be substantially reduced. Also, the channel array may comprise a polarity of sections connected in series through curved channel array section(s), so that the size of the deflector in the length dimension can by greatly reduced. In addition, it is noted that optical deflectors using NLOPs for the channel guiding core in the present invention have the advantage to be mass-produced with low cost, compared with the one using an inorganic electrooptical material for the guiding core.

Based on the above teachings, it will be apparent to one of ordinary skill in the art that many modifications and variations of the present invention can be made thereto without departing from the spirit and scope of the invention as set forth herein.

For example, this type of electrooptical deflector can be inherently substantially workable with the channel-to-channel separations in the channel array being uniform or non-uniform.

What is claimed is:

1. An optical deflector that overcomes conventional geometry limitations, comprising:

an array of optical waveguide channels formed between a first common surface and a second common surface;

an electrooptical material formed in said optical waveguide channels;

a first electrode covering said first surface;

a second electrode covering said second surface; and, a means for supplying an electrical controlling signal to said first and second electrodes, wherein at least one of said first and second electrodes comprises a plurality of prism-shaped electrodes, and said prism-shaped electrodes cause an optical beam to be deflected by inducing substantially linear phase differences among said optical waveguide channels, depending on an electrical field or fields generated between said first and second electrodes by said electrical controlling signal.

2. The optical deflector according to claim 1, wherein said plurality of prism-shaped electrodes comprise a first and a second sets of triangle-shaped electrodes, and said electrical controlling signal comprises a pair of voltages having opposite polarities and being applied to said first and second sets of triangle-shaped electrodes.

3. The optical deflector according to claim 1, wherein said electrooptical material is formed as a light guiding layer in said optical waveguide channels, and said electrooptical material is selected from a group of materials consisted of electrooptical polymers, $LiNbO_3$, PLZT, $BaTiO_3$, $PbTiO_3$, $LiTaO_3$, ADP, KDP, $KNbO_3$, SBN, AMO and KTN.

4. The optical deflector according to claim 1 further comprises an optical input port and K optical output ports, wherein K is an integer larger than 1; and, said optical deflector forms a 1×K optical switch.

5. The optical deflector according to claim 4 further comprises a plurality of said 1×K optical switches, wherein said optical deflector forms an M×N optical switch, with each of M and N being an integer larger than 1.

6. The optical deflector according to claim 1, wherein said electrical controlling signal comprises a scanning signal, and said optical deflector forms an optical scanner.

7. The optical deflector according to claim 6 further comprises a vertical scan means and an optical projection means, wherein said optical deflector forms a 2-D scanning device or a display device.

8. The optical deflector according to claim 7 further comprises a flexible cable attached to an portable frame, wherein said display device is mounted on said portable frame; an image-modulated optical beam is fed to said display device through said flexible cable and said optical beam is directed to the pupil of the eye of an observer by said display device to produce an image on the retina of the eye.

9. An optical deflector that overcomes conventional geometry limitations, comprising:

an array of optical waveguide channels formed between a first common surface and a second common surface;

an electrooptical material formed in said optical waveguide channels;

a first electrode covering said first surface;

a second electrode covering said second surface; and, a means for supplying an electrical controlling signal to said first and second electrodes, wherein said electrooptical material is also a ferroelectrical material and comprises a first set and a second set of prism-shaped spontaneous polarization domain regions; the spontaneous polarization in said first set is substantially oriented along a direction from said first surface to said second surface or from said second surface to said first surface, but, said direction is substantially anti-parallel to the spontaneous polarization in said second set; said first and second sets cause an optical beam to be deflected by inducing substantially linear phase differences among said optical waveguide channels, depending on said electrical controlling signal applied between said first and second electrodes.

10. The optical deflector according to claim 9, wherein said prism-shaped spontaneous polarization domain regions comprise triangle-shaped spontaneous polarization domain; said electrooptical material is formed as a light guiding layer in said optical waveguide channels; and, said electrooptical material is selected from a group of materials consisted of electrooptical polymers, $LiNbO_3$, PLZT, $BaTiO_3$, $PbTiO_3$, $LiTaO_3$, ADP, KDP, $KNbO_3$, SBN, AMO and KTN.

11. The optical deflector according to claim 9 further comprises an optical input port and K optical output ports, wherein K is an integer larger than 1; and, said optical deflector forms a 1×K optical switch.

12. The optical deflector according to claim 11 further comprises a plurality of said 1×K optical switches, wherein said optical deflector forms an M×N optical switch, with each of M and N being an integer larger than 1.

13. The optical deflector according to claim 9, wherein said electrical controlling signal comprises a scanning signal, and said optical deflector forms an optical scanner.

14. The optical deflector according to claim 13 further comprises a vertical scan means and an optical projection means, wherein said optical deflector forms a 2-D scanning device or a display device.

15. The optical deflector according to claim 14 further comprises a flexible cable attached to an portable frame, wherein said display device is mounted on said portable frame, an image-modulated optical beam is fed to said display device through said flexible cord, and said optical beam is directed to the pupil of the eye of an observer by said display device to produce an image on the retina of the eye.

16. An optical deflector comprising:

an array of optical waveguide channels formed between a first common surface and a second common surface;

an electrooptical material formed in said optical waveguide channels;

a first electrode covering said first surface;

a second electrode covering said second surface; and, a means for supplying an electrical controlling signal to at least one of said first and second electrodes, wherein at least one of said first and second electrodes comprises a plurality of triangle- or prism-shape-based electrodes, and at least one of said plurality of triangle- or prism-shape-based electrodes has at least one tilt side across at least two of said optical waveguide channels.

* * * * *